United States Patent

[11] 3,598,229

| [72] | Inventor | Anthony A. Spycher<br>Corning, N.Y. |
| [21] | Appl. No. | 881,231 |
| [22] | Filed | Dec. 1, 1969 |
| [45] | Patented | Aug. 10, 1971 |
| [73] | Assignee | Corning Glass Works<br>Corning, N.Y. |

[54] ARTICLE CONVEYOR
10 Claims, 9 Drawing Figs.

[52] U.S. Cl. ................................................. 198/179
[51] Int. Cl. ............................................ B65g 15/00
[50] Field of Search .......................................... 198/179,
131, 160

[56] References Cited
UNITED STATES PATENTS
3,352,405  11/1967  Gartin .......................... 198/179

*Primary Examiner*—Richard E. Aegerter
*Attorneys*—Clarence R. Patty, Jr. and Charles W. Gregg ABSTRACT: A conveyor for transporting or conveying a succession or plurality of relatively elongate articles through a looped path of travel for operations or work to be performed thereon. Each such article may comprise, for purposes of example only, a bundle of fiber optics at least one end of which is to be trimmed and thereafter polished to provide a suitable light-transmitting optical surface thereon. The conveyor comprises a pair of first and second articulated chains which carry, respectively, a succession of article support members each of which have channels therein for receiving an end portion of one of said articles to be transported or conveyed and inserted therein, and a succession of article clamping members, one associated with each said support member, for clamping each said article inserted in the channel of the respectively associated support member to generally maintain the article in its respective support member in the general attitude in which it is initially inserted in the channel of the support member.

PATENTED AUG 10 1971 3,598,229
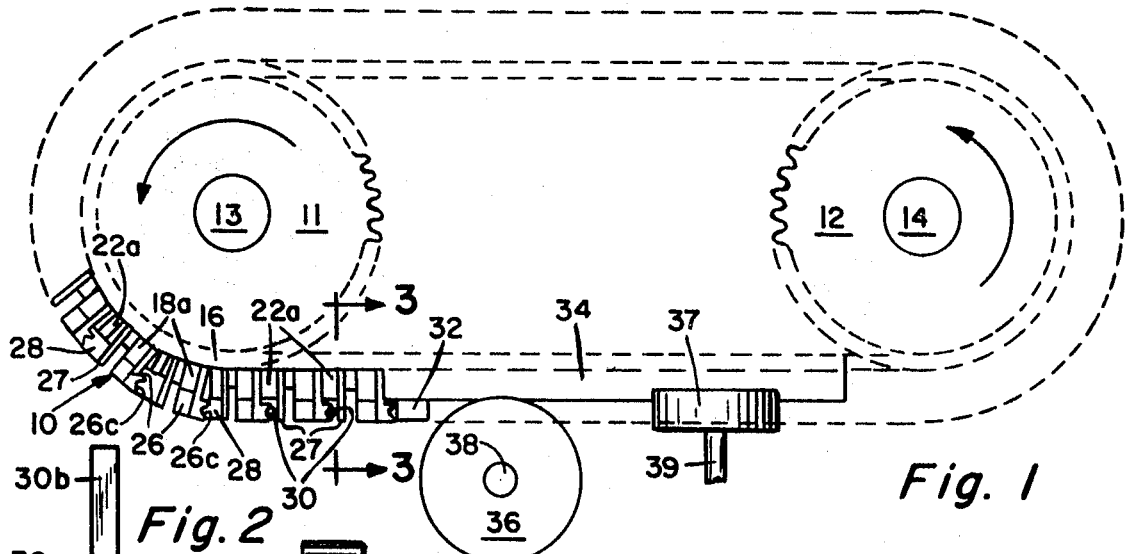
Fig. 1
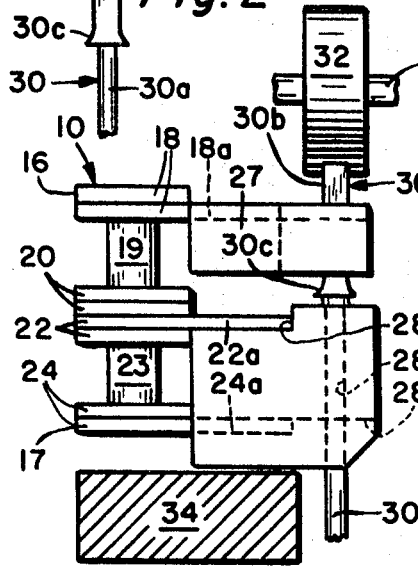
Fig. 2
Fig. 3
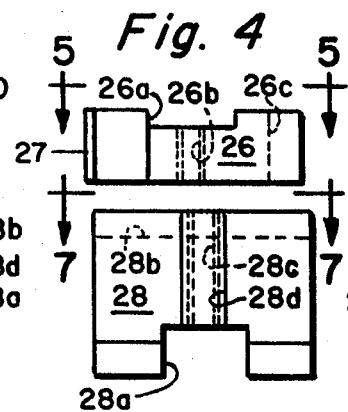
Fig. 4
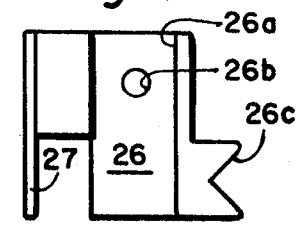
Fig. 5
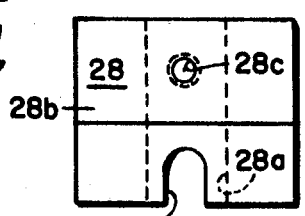
Fig. 6    Fig. 7
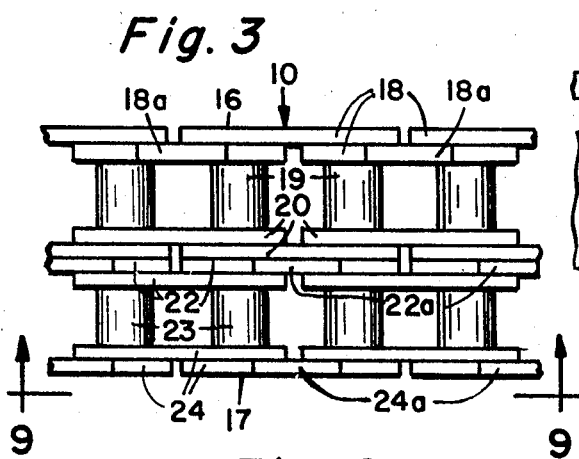
Fig. 8
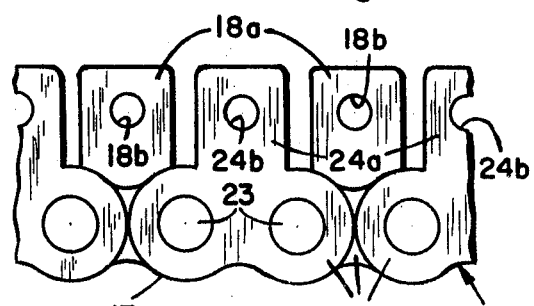
Fig. 9
INVENTOR.
Anthony A. Spycher
BY Charles W. Gregg
AGENT 3,598,229

ARTICLE CONVEYOR

BACKGROUND OF THE INVENTION

For obvious economic reasons, it is expedient to increase the speed at which work or operations to be performed on a plurality or succession of articles is performed. For example, heretofore, small portions of the ends of bundles of fiber optics were often trimmed or severed from the rest of the length of each such bundle and the tips or end remaining on each such bundle, following each said trimming or severing operation, was then smoothed or polished. The handling of said bundles during such operations or work was done manually and was, therefore, relatively time consuming and uneconomical. Accordingly, the article conveyor of the present invention was developed to transport or convey articles of the class mentioned through a path of travel at certain points along which the desired work or operations were performed thereon by devices located at said points along said path.

BRIEF SUMMARY OF THE INVENTION

In practicing the invention disclosed, there is provided a conveyor comprising an articulated side-by-side pair of similar endless chains which are supported for movement thereof through a looped path of travel and which are provided with a succession of pairs of associated article support members and article clamping members, each support member being arranged for initially receiving one of said articles manually supplied thereto and supporting such article, and the clamping member, associated with the respective support member, thereafter clamping the respective article for transportation or conveyance thereof by the conveyor through at least a portion of said path of travel of the conveyor including said chains.

The invention will best be understood with reference to the accompanying drawings and the description which follows.

BRIEF DESCRIPTION OF THE DRAWINGS

FIG. 1 is a schematic view illustrating one type of arrangement of an article conveyor embodying the invention;

FIG. 2 is a view of an end section of one type of elongate article for the transporting of which the conveyor embodying the invention may be employed;

FIG. 3 is an enlarged elevational view taken generally along line 3-3 of FIG. 1 and illustrating an associated pair of article support and clamping members which are a part of the conveyor embodying the invention;

FIG. 4 comprises an elevational end view of one of the clamping members employed on the conveyor of the invention;

FIG. 5 is a top plan view of the clamping member of FIG. 4 such view being taken generally along line 5-5 of FIG. 4;

FIG. 6 is a view similar to FIG. 4 and illustrating one of the support members employed on the conveyor of the invention;

FIG. 7 is a view similar to FIG. 5 and taken generally along line 7-7 of FIG. 6;

FIG. 8 is an enlarged elevational view of a length of an articulated side-by-side pair of similar chains forming a part of the conveyor of the invention; and FIG. 9 is a bottom plan view of the chains of FIG. 8, such view being taken generally along line 9-9 of FIG. 8.

Similar reference characters refer to similar parts in each of the figures of the drawings.

PREFERRED EMBODIMENT OF THE INVENTION

Referring to the drawings in detail, there is shown schematically in FIG. 1 a conveyor 10 which loops about and is supported by first and second sprocket wheels 11 and 12 for driven movement of the conveyor by at least one of such sprockets through a looped path of travel. Sprocket wheels 11 and 12 are mounted on the ends of suitable shafts or axles 13 and 14, respectively, at least one of which imparts rotational movement or rotation to its associated sprocket wheel in the direction indicated by an arrow thereon. Such rotation imparts corresponding movement of conveyor 10 through its looped path of travel and corresponding rotation of the other of said sprockets. The apparatus for supporting shafts or axles 13 and 14 and for imparting said movement to one of said sprockets is omitted from the drawings for purposes of simplification thereof. However, the apparatus arrangement of FIG. 1 will be readily apparent to those skilled in the art from the above brief description and a brief glance at such drawing Fig.

Referring further to FIG. 1 taken in conjunction with FIGS. 3 through 9, conveyor 10 includes a pair of side-by-side (or upper and lower) and articulated endless chains 16 and 17 (FIGS. 3, 8 and 9). Chain 16 comprises a first succession of link plates such as 18 which are pivotally mounted on first ends of a plurality of pivot pins such as 19 and a second succession of link plates such as 20 which are pivotally mounted on the second ends of the pivot pins such as 19, such successions of plates thereby being spaced apart from each other. Similarly, chain 17 comprises a first succession of link plates such as 22 which are pivotally mounted on first ends of a plurality of pivot pins such as 23 and a second succession of link plates such as 24 which are pivotally mounted on the second ends of the pivot pins such as 23, such successions of plates thereby also being spaced apart from each other.

Alternate ones of the link plates, such as 18, of chain 16 include tab or ear portions, such as 18a, each of which project from substantially the center of the respective link plate in a direction outboard of chain 16 when such chain is disposed in a loop such as illustrated in FIG. 1, that is to say, in a direction away from the centerline of the loop of conveyor 10 when such conveyor is arranged as illustrated in FIG. 1. It is pointed out that, if found desirable or expedient to do so, alternate ones of the link plates such as 20 of chain 16 could also be provided with tab ear portions similar to 18a and, in such event, the tab or ear portions would be provided on the ones of the link plates, such as 20, which correspond to the ones of the link plates, such as 18, on which ear portions 18a are provided, that is to say, on the ones of the link plates such as 20 which are directly opposite the link plates such as 18 having the ear portions 18a.

On chain 17, alternate ones of the link plates such as 24 are provided with extending ear portions such as 24a which are similar to and extend in directions corresponding to the directions in which ear portions 18a extend on said link portions such as 18 of chain 16. However, the ones of the alternate link plates such as 24 on which the ear portions such as 24a are provided are the ones of such plates which are not directly opposite the alternate link plates such as 18 on which ear portions such as 18a are provided, that is to say, the ear portions such as 24a are provided on alternate ones of the link plates such as 24 of chain 17 so as to be staggered, in directions extending straight across the widths of chains 16 and 17, from the ear portions such as 18a provided on alternate ones of the link plates such as 18 of chain 16. This is best illustrated in FIG. 9 of the drawings.

In addition to the ear portions such as 24a provided on the alternate link plates such as 24 of chain 17, similar ear portions such as 22a (FIGS. 3 and 8) are provided on corresponding alternate ones of the link plates such as 22 of chain 17 so that they are directly opposite said ear portions 24a in directions extending straight across the width of chain 17.

Referring now to FIGS. 3, 4 and 5 of the drawings, taken in conjunction with FIG. 1, one of a plurality of clamping members such as 26 and each having a channel such as 26a is secured to each of the previously discussed ear or tab portions such as 18a on said alternate link plates such as 18 of chain 16. Each clamping member such as 26 may, for example, be secured to its respectively associated ear portion, such as 18a, by disposing such ear portion in channel 26a of the respective clamping member and inserting a suitable screw through a hole such as 18b provided in each said ear portion such as 18a and screwing said screw into complemental threads in a cooperatively located and threaded hole such as 26b provided in each respective clamping member such as 26.

As best illustrated in FIG. 5, each clamping member such as 26 is also provided, on the forward side of such member for or in relation to, the direction of movement of conveyor 10, with a groove such as 26c which is preferably V-shaped and in which a portion of an elongate article to be conveyed or transported by the conveyor 10 of the invention is clamped as hereinafter discussed in an operational example of the invention. As best illustrated in FIGS. 4 and 5, each clamping member such as 26 is also provided, on the rearward side of such member in relation to or for the direction of movement of conveyor 10, with an associated leaf spring means such as 27 which is affixed, in any suitable manner, to said rearward side of the respectively associated clamping member.

Referring now to FIGS. 3, 6 and 7 of the drawings, taken in conjunction with FIG. 1, one of a plurality of article support members such as 28 and each embodying a channel such as 28a and a recessed portion such as 28b is secured to each of the previously discussed tab or ear portions such as 22a and 24a on said alternate link plates such as 22 and 24, respectively, of chain 17. Each support member such as 28 may, for example, be secured to its respectively associated ear portions, such as 22a and 24a, by disposing such ear portions in recess 28b and channel 28a, disposing such ear portions in recess 28b and channel 28a, respectively, of the associated support member and inserting suitable screws through holes such as 24b provided in each said ear portion and screwing said screws into complemental threads in a cooperatively located hole such as 28c provided in each respective support member such as 28. As illustrated in FIGS. 7 and 8, each support member such as 28 is also provided, on the outboard end of such member, with a channel such as 28d in which a portion of an elongate article to be conveyed or transported by conveyor 10 of the invention is manually inserted and supported as hereinafter discussed in an operational example of the invention.

There is shown in FIGS. 2 and 3 end sections only of elongate articles such as 30, the conveyance or transportation of which the inventive conveyor disclosed may be employed. Each article such as 30 may, for example, comprise a bundle of fiber optics and the end section of each respective such article comprises a first end portion such as 30a and a second end portion which comprises a sleeve such as 30b surrounding at least a part of the respective bundle adjacent the extreme end thereof. Each sleeve such as 30b includes a flange such as 30c which defines the meeting line of said first and second end portions of the bundle such as 30 on which the respective sleeve such as 30b is provided.

There is also shown in FIGS. 1 and 3 of the drawings a device 32 illustrated in FIG. 3 as a wheel the centerline of the outer periphery of which is in general alignment with the path of movement of the extreme ends of the articles such as 30 when such articles are transported through a desired path of travel as hereinafter discussed. When device 32 is a wheel as illustrated in FIG. 3, it is rotatively mounted on a suitable axle such as 33 and is normally biased as by gravity to a lowermost position shown in FIG. 3. However, such wheel can, if found more expedient to do so, be normally spring biased to its said lowermost position. It is also pointed out that device 32 could, if desired, be a suitable shaped ramp rather than a wheel as illustrated. This will be made more apparent hereinafter in the description.

There is also shown in FIGS. 1 and 3 an elongate support 34 which extends along a part of the path of travel of conveyor 10 and beneath such conveyor for support of parts thereof at, at least, one point in such part of such path of travel as hereinafter discussed. For purposes only of an operational example of the invention, there is additionally shown in FIG. 1 first and second devices for performing operations or work on articles being transported by the conveyor of the invention. Such devices may, for example, comprise a circular saw or cut off wheel such as 36 and a grinding or polishing wheel such as 37, respectively. The wheel or saw such as 36 may, for example, have a diamond edge for cutting off or severing a selected length of the end of each of a plurality of metal articles, such as the aforementioned sleeve portions 30b of the articles such as 30, said edge being disposed in the path of movement of said ends of such articles when the articles are conveyed or transported by conveyor 10 through a part of the looped path of travel of such conveyor as hereinafter discussed. Wheel or saw 36 is affixed, for driven rotation thereof, to one end of a shaft or axle 38 whose other end is attached to any suitable drive mechanism for imparting rotation to said shaft in any one of the many manners well known in the art.

The outer periphery of the aforementioned grinding or polishing wheel 37 is shown in general alignment with the path of movement of the ends or tips of the articles such as 30 when the articles are conveyed or transported by conveyor 10 through a part of the looped path of travel of such conveyor as hereinafter discussed. Grinding or polishing wheel 37 is supported in its said alignment so that the tips remaining on the sleeve portions of the articles such as 30, following the previously discussed severing of a selected length of the end of each such sleeve portion, contact the outer periphery of wheel 37 as each respective tip passes thereunder, and each said tip is thereby smoothed or polished by the grinding and polishing wheel. For supporting wheel 37 as described, and imparting rotation or rotational movement to such wheel for said grinding and polishing purposes, wheel 37 is affixed on one end of an axle or shaft such as 39 whose other end is attached to any drive mechanism suitable for imparting rotation to such shaft or axle in any one of the many manners well known in the art.

The arrangement of the apparatus of the invention having been described in detail, a brief operational example of the invention will now be given.

It will be assumed that conveyor 10 is being driven through its looped path of travel by the driven rotation of one or both of the sprocket wheels 11 and 12 (FIG. 1). It will also be assumed that the devices such as 36 and 37 which are to perform operations or work in the articles such as 30 being conveyed or transported by conveyor 10 as heretofore discussed are being rotated for the purpose of performing said operations or work on said articles as they pass the respective devices. At such time an operator or workman, whose workplace or station is situated adjacent to or along the lower left hand section of the path of travel of conveyor 10 (when viewing FIG. 1 of the drawings) manually inserts one of a plurality of articles, such as 30 and to be transported by conveyor 10, in the channel 28d of each article support member 28 moving past his workplace or station, each such article being inserted in its respectively associated channel, such as 28d, in an attitude such as generally illustrated in FIG. 3, that is, so that the previously discussed first end portion such as 30a of the respective article is disposed in its said respectively associated channel. Said articles are inserted in said channels of their respectively associated support members such as 28 when such members are moving through the lower left hand arc of the path of travel (viewing FIG. 1) of conveyor 10 because, at such time, the clamping member such as 26 associated with each respective support member occupies an attitude in which the groove such as 26c in the respective clamping member is out of alignment with the channel such as 28d in the associated support member and, therefore, one of said articles can, at such time, be readily inserted in each said channel such as 28d. This will be readily apparent to those skilled in the art from a brief glance at FIG. 1.

As each associated pair of article support and clamping members moves out of said lower left hand arc of the path of travel of conveyor 10 and approaches and moves into the straight part of such path just beyond the end of said arc, each respective support member such as 28 moves toward the clamping member such as 26 of the immediately preceding pair of associated support and clamping members, and the forward wall or surface of the second end portion such as 30b of the respective article 30 supported in the channel of the support member immediately following said preceding pair of members, is moved into contact with the rearward surface of the leaf spring means such as 27 affixed to the rearward side of the clamping member of said preceding pair of members. Immediately thereafter, the respective clamping member such as 26 immediately following said preceding pair of members moves towards channel 28d in the support member associated with such clamping member, groove 26c in the clamping member moves into general alignment with said channel 28d, and the rearward wall or surface of the second end portion such as 30b of the respective article 30 supported in said channel 28d is contacted by parts of the walls of said groove 26c. Said article 30 is, thereby, clamped relatively firmly between said parts of the walls of groove 26c and said leaf spring means 27 of the clamping member of said immediately preceding pair of clamping and support members.

Referring now to FIG. 3 taken in conjunction with FIG. 1, it will be assumed that an article such as 30 is clamped within groove 26c of its associated clamping member, such as 26, so that the lower surface of the flange such as 30c of end portion or sleeve 30b of the respective article 30 is not in a seated relationship with or against that portion of the top surface of the associated support member such as 28 which borders channel 28d in such support member. Under such conditions, the end or tip of said article such as 30 will contact the lower surface of device 32, during the conveying or transporting of such article by conveyor 10 beneath such device, and said lower surface will, thereby, depress the respective article 30 to cause said lower surface of flange 30c of sleeve or end portion 30b of the article to seat against said portion of the top surface of said associated support member such as 28.

Each of a plurality, or succession of articles such as 30, conveyed or transported by conveyor 10, are moved or transported past the devices such as 36 and 37 for operations or work to be performed on the articles as in the examples previously discussed. When each said article is moved or transported by conveyor 10 out of the lower straight portion (viewing FIG. 1) of the looped path of travel of the conveyor and into the lower right-hand arc of such path, the clamping and support members such as 26 and 28, associated with each respective article such as 30, are actuated in directions reverse to that previously described for the clamping of one of such articles and each respective article can then be removed, in any convenient manner such as manually by an operator or workman, from the channel such as 28d in the support member such as 28 supporting such article. This will also be readily apparent to those skilled in the art.

It is pointed out that when a device such as 32 (FIGS. 1 and 3) depresses an article such as 30 for the purpose previously discussed, or when a device such as grinding or polishing wheel 37 applies downward force on the end of an article such as 30 for the purpose of grinding or polishing such end as also previously discussed, the previously mentioned elongate support 34 will prevent any undue downward movement of the support members, such as 28, moving along the portion of the path of travel of conveyor 10 below which elongate support 34 is provided, a certain amount of such downward movement otherwise possibly being permitted by a certain amount of flexibility inherent in chains 16 and 17. It is also expedient to point out that the sprocket wheels, such as 11 and 12, and employed with a conveyor such as disclosed are each preferably, but not necessarily, so-called double-width sprocket wheels, that is, sprocket wheels which have two sets of sprocket teeth for engaging the links of both of the chains 16 and 17. Such double-width sprocket wheels are well known in the art.

It is further pointed out that the inventive conveyor disclosed can be used for transporting or conveying articles other than the fiber optic bundles such as discussed herein and, also, that such a conveyor can be supported so as to move through looped paths of travel extending in other planes, such as a vertical plane, for example, rather than through a path of travel extending in a horizontal plane as illustrated in FIG. 1.

I claim:

1. A article conveyor supported for movement in a selected direction through a looped path of travel such conveyor comprising;
    A. an articulated side-by-side pair of similar endless chains each including first and second spaced apart successions of link plates pivotally mounted on first and second opposite ends, respectively, of pivot pins to provide pivotal coupling between the link plates of each respective succession thereof, alternate link plates of at least one succession of such plates on each said chain each having an ear portion projecting from the center of the respective link plate in a direction outboard of the respective chain and such ear portions on one of said pair of chains being in staggered relationships with such portions on the other of said pair of chains in directions extending straight across the widths of such chains;
    B. an article support member affixed to each said ear portion of each of said link plates of one of said chains, each such member including a channel therein having an open side outboard of the respective chain for receipt in such channel of the outer periphery of a first end portion of an elongate article to be conveyed by said conveyor and each such channel having a width slightly larger than said outer periphery of said article;
    C. an article-clamping member associated with each said support member and each affixed to one of said ear portions of each of said link plates of the other of said chains, each such clamping member having, on the forward side thereof, for said direction of movement through said looped path of travel, a groove for receipt therein of the rearward wall of a second end portion of the elongate article supported by the respectively associated support member, such second end portion of the elongate article adjoining said first end portion thereof and each said clamping member having on the rearward side thereof, for said direction of movement through said looped path of travel, a leaf spring means for contacting the forward wall of the second end portion of a similar one of said articles disposed in said channel of the support member immediately following each preceding support member.

2. A conveyor in accordance with claim 1 and in which each of said elongate articles comprises a bundle of fiber optics.

3. A conveyor in accordance with claim 2 and in which the second end portions of said fiber optic bundles are each provided with a sleeve having a flange defining the meeting line of said first and second end portions of the respective bundle.

4. A conveyor in accordance with claim 3 and further including a device in said looped path of travel of the conveyor for assuring seating of said flange of said sleeve on each said bundle against the face of said support member which faces said groove in the respectively associated one of said clamping members and in which each respective bundle is clamped.

5. A conveyor in accordance with claim 1 and in which said first end portions of said elongate articles are manually inserted in said channels in said support members for conveyance of the articles.

6. A conveyor in accordance with claim 2 and in which said first end portions of said elongate articles are manually inserted in said channels in said support members for conveyance of the articles.

7. A conveyor in accordance with claim 3 and in which said first end portions of said elongate articles are manually inserted in said channels in said support members for conveyance of the articles.

8. A conveyor in accordance with claim 4 and in which said first end portions of said elongate articles are manually inserted in said channels in said support members for conveyance of the articles.

9. A conveyor in accordance with claim 1 and in which said looped path of travel extends in a horizontal plane.

10. A conveyor in accordance with claim 2 and in which said looped path of travel extends in a horizontal plane.